United States Patent
Thacker et al.

(10) Patent No.: US 8,600,201 B2
(45) Date of Patent: Dec. 3, 2013

(54) OPTICAL DEVICE WITH ENHANCED MECHANICAL STRENGTH

(75) Inventors: Hiren D. Thacker, San Diego, CA (US); Ivan Shubin, San Diego, CA (US); John E. Cunningham, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 339 days.

(21) Appl. No.: 13/032,561

(22) Filed: Feb. 22, 2011

(65) Prior Publication Data

US 2012/0213467 A1   Aug. 23, 2012

(51) Int. Cl.
*G02B 6/12* (2006.01)

(52) U.S. Cl.
USPC .......................................................... 385/14

(58) Field of Classification Search
None
See application file for complete search history.

(56) References Cited

U.S. PATENT DOCUMENTS

| | | | |
|---|---|---|---|
| 7,848,599 B2* | 12/2010 | Cunningham et al. | 385/1 |
| 8,078,013 B2* | 12/2011 | Li et al. | 385/1 |
| 8,131,119 B2* | 3/2012 | Cunningham et al. | 385/1 |
| 8,150,223 B2* | 4/2012 | Li et al. | 385/40 |
| 8,179,935 B2* | 5/2012 | Santori et al. | 372/34 |
| 2006/0198416 A1* | 9/2006 | Yamazaki | 372/94 |
| 2009/0245296 A1* | 10/2009 | Santori et al. | 372/20 |
| 2010/0290736 A1* | 11/2010 | Cunningham et al. | 385/14 |

* cited by examiner

Primary Examiner — Sung Pak
(74) Attorney, Agent, or Firm — Park, Vaughan, Fleming & Dowler LLP; Steven E. Stupp

(57) ABSTRACT

An optical device implemented on a substrate (such as silicon) is described. This optical device includes a wavelength-sensitive optical component with a high thermal resistance to a surrounding external environment and a low thermal resistance to a localized thermal-tuning mechanism (such as a heater), which modifies a temperature of the wavelength-sensitive optical component, thereby specifying an operating wavelength of the wavelength-sensitive optical component. In particular, the thermal resistance associated with a thermal dissipation path from the thermal-tuning mechanism to the external environment via the substrate is increased by removing a portion of the substrate to create a gap that is proximate to the thermal-tuning mechanism and the wavelength-sensitive optical component. Furthermore, the optical device includes a binder material mechanically coupled to the substrate and proximate to the gap, thereby maintaining a mechanical strength of the optical device.

20 Claims, 6 Drawing Sheets

US 8,600,201 B2

OPTICAL DEVICE WITH ENHANCED MECHANICAL STRENGTH

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure relates to techniques for communicating optical signals. More specifically, the present disclosure relates to an optical device that is thermally isolated from the surrounding environment and which has enhanced mechanical strength.

2. Related Art

Wavelength division multiplexing (WDM) is widely used to communicate modulated data at different carrier wavelengths on a common optical waveguide. WDM can overcome optical-fiber congestion, which is a potential problem in optical modules that include parallel optical transceivers with one channel per optical fiber. In particular, by significantly reducing the number of optical fibers per optical module, WDM multiplexing can simplify optical modules, thereby reducing their cost and size.

In dense WDM (DWDM), a narrow spacing between adjacent wavelengths is used. This is typically achieved by modulating data directly onto a highly stable optical carrier, and then combining multiple carriers in an optical fiber. DWDM allows a large number of channels to be accommodated within a given wavelength band, and thus offers high performance.

In DWDM, a variety of optical devices are used as: modulators, multiplexers (such as add filters), de-multiplexers (such as drop filters), filters and switches. In order to compensate for fabrication variation, temperature variation and/or laser wavelength drift, the operating wavelengths of the optical devices (such as the resonant wavelength of a ring resonator) are typically phase-tuned to target wavelengths corresponding to the channels in a DWDM link. Depending on the system requirements, a tuning range of at least 180° may be needed.

Thermal tuning is a popular tuning technique because it provides the ability to produce large phase shifts. Existing thermal tuning techniques include direct heating (which is implemented by doping in an optical waveguide) and indirect heating (in which a heater is proximate to the optical waveguide). Typically, the direct-heating technique is more energy-efficient than indirect heating, but it can prevent the optical waveguide from performing additional functions (because of the constraint on the doping density), and it can introduce additional optical losses due to free-carrier absorption (which can degrade the quality factor of an optical resonator).

In principle, optical devices can be made on silicon substrates, because silicon provides many benefits for optical communication. For example, the high index-of-refraction contrast between silicon and silicon dioxide can be used to create sub-micron waveguides to confine light with spatial densities that are up to 100× larger than in a single-mode optical fiber. Furthermore, by using a silicon-on-insulator (SOI) technology, a silicon waveguide can be surrounded by silicon dioxide on all four sides, which facilitates low-loss, on-chip waveguides and active devices (such as detectors and modulators). Silicon-based optical devices can be used to implement a wide variety of optical components for use in WDM communication. These silicon-based optical devices offer numerous advantages, including: miniaturization, low-energy modulation, the ability to integrate with other devices in silicon, and/or the ability to leverage the large, existing silicon manufacturing infrastructure.

Nonetheless, there are problems associated with silicon-based optical devices. A notable problem is heat dissipation in the silicon, as well as in the top metal and the dielectric stack. While the high thermal conductivity of silicon helps remove the heat dissipated by electrical circuits, it can make it more difficult to thermally tune a silicon-based optical device. In particular, because the operating wavelength of a silicon-based optical device (such as the resonant wavelength of an optical resonator) strongly depends on temperature, the operating wavelength is typically tuned using either direct or indirect heating to change the operating temperature of the silicon-based optical device. However, the high thermal conductivity of silicon results in excessive thermal coupling to the surrounding environment. Consequently, thermal tuning of silicon-based optical devices often consumes a disproportionately large amount of energy (typically, 50-100 mW for a phase shift of 180°). This high power consumption can offset the advantages provided by silicon, and makes it more difficult to use silicon-based optical devices to implement optical communication (such as WDM) in computing systems (especially in systems that have multiple instances of the optical devices).

One existing approach to address this problem is to increase the thermal isolation of a silicon-based optical device (thereby reducing the thermal-tuning power) by removing at least a portion of the silicon substrate proximate to the optical device, thus creating a free-standing portion of the optical device. For example, the silicon substrate may be micro-machined to create a backside etch pit. However, the free-standing portion of the optical device is mechanically unsupported, which can result in problems during subsequent processing. In particular, following completion of wafer-scale fabrication, silicon substrates are typically subjected to manufacturing operations, such as: wafer-scale testing, wafer-scale bumping, die singulation by mechanical sawing or laser dicing, and packaging (for example, flip-chip integration by thermocompression bonding and wirebonding). These manufacturing operations often include temperature cycles that place mechanical stress on the mechanically unsupported portions of the optical device, such as the back-end-of-line (BEOL) interlayer dielectric (ILD) stack. These manufacturing challenges are expected to be increasingly important as SOI technologies are scaled to include fragile, ultra-low dielectric constant ILD stackups for improved performance.

Hence, what is needed is an optical device that can be thermally tuned without the above-described problems.

SUMMARY

One embodiment of the present disclosure provides an optical device. In this optical device, a substrate includes a wavelength-sensitive optical component and a thermal-tuning mechanism. The thermal-tuning mechanism modifies the temperature of the wavelength-sensitive optical component, thereby specifying an operating wavelength of the wavelength-sensitive optical component. Moreover, a portion of the substrate is removed to create a gap in the substrate defined by borders. This gap is under the thermal-tuning mechanism and at least a portion of the wavelength-sensitive optical component. Furthermore, the optical device includes a binder material mechanically coupled to the substrate and proximate to the gap, thereby maintaining a mechanical strength of the optical device.

Note that the substrate may include a semiconductor (such as silicon). Moreover, the binder material may include a compound selected from: a polymer, silicon dioxide, polyimide, silicon nitride and/or alumina.

Additionally, the binder material may, at least in part, fill the gap. For example, the binder material may substantially fill the gap. Alternatively or additionally, the binder material may be mechanically coupled to a top surface of the substrate above the gap. In some embodiments, the gap has a width and a depth, and the width is approximately equal to or smaller than the depth (i.e., the gap may have a high aspect ratio).

Furthermore, the wavelength-sensitive optical component may include: an optical modulator, an optical multiplexer, an optical de-multiplexer, an optical detector, an optical source, an optical switch, and/or an optical filter.

Another embodiment provides an optical device that includes: a substrate, an intermediate layer disposed on the substrate, and a semiconductor layer disposed on the intermediate layer. The semiconductor layer may include the wavelength-sensitive optical component and the thermal-tuning mechanism. Moreover, the portion of the substrate is removed to create the gap in the substrate, and the binder material may be mechanically coupled to the substrate and proximate to the gap.

Note that the substrate may include silicon, the intermediate layer may include silicon dioxide, and the semiconductor layer may include silicon. For example, the substrate, the intermediate layer and the semiconductor layer may comprise a silicon-on-insulator technology.

Another embodiment provides a method for fabricating an optical device. In this method, the wavelength-sensitive optical component and the thermal-tuning mechanism are defined on the substrate in the optical device. Note that the thermal-tuning mechanism modifies the temperature of the optical component, thereby specifying the operating wavelength of the wavelength-sensitive optical component. Then, the portion of the substrate is selectively removed to create the gap in the substrate defined by borders, where the gap in the substrate is proximate to the thermal-tuning mechanism and the wavelength-sensitive optical component. Furthermore, the binder material, mechanically coupled to the substrate and proximate to the gap, is deposited, thereby maintaining the mechanical strength of the optical device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
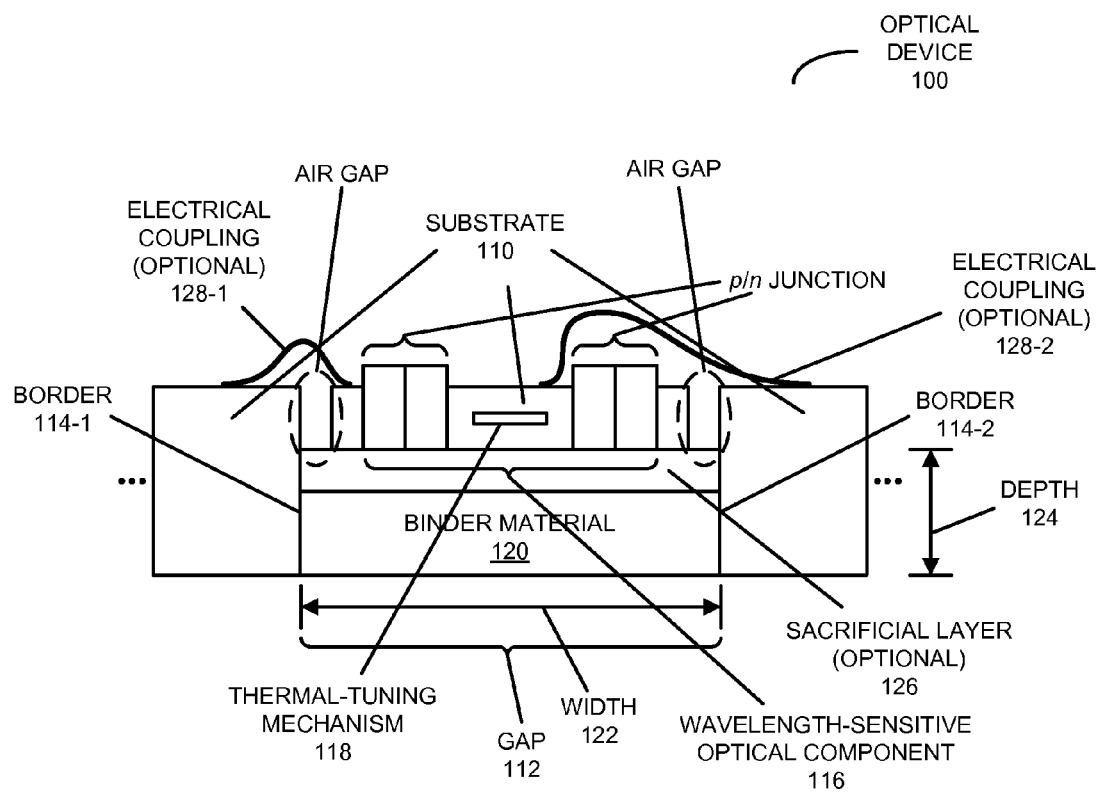
FIG. 1 is a block diagram illustrating a tunable optical device in accordance with an embodiment of the present disclosure.

Embodiments of an optical device, a system that includes the optical device, and a technique for fabricating the optical device are described. This optical device is implemented on a substrate (such as silicon), and includes a wavelength-sensitive optical component with a high thermal resistance to a surrounding external environment and a low thermal resistance to a localized thermal-tuning mechanism (such as a heater), which modifies a temperature of the wavelength-sensitive optical component, thereby specifying an operating wavelength of the wavelength-sensitive optical component. In particular, the thermal resistance associated with a thermal dissipation path from the thermal-tuning mechanism to the external environment via the substrate is increased by removing a portion of the substrate to create a gap that is proximate to the thermal-tuning mechanism and the wavelength-sensitive optical component. Furthermore, the optical device includes a binder material mechanically coupled to the substrate and proximate to the gap, thereby maintaining a mechanical strength of the optical device.

In this way, this fabrication technique increases a thermal isolation of the thermal-tuning mechanism and at least a portion of the wavelength-sensitive optical component, and reduces power consumption associated with thermal tuning of the wavelength-sensitive optical component (for example, 10-100× less power consumption than existing silicon-based optical components). This reduction in power consumption may facilitate systems that use DWDM with a channel spacing of approximately 50 GHz, as well as high-performance computing systems that include optical interconnects. In addition, by maintaining the mechanical strength of the optical device, the fabrication technique increases the yield of the fabrication process by helping to ensure that the portion of the wavelength-sensitive optical component is mechanically supported during processing after wafer-scale fabrication. Thus, the fabrication technique may reduce the cost and/or may increase the reliability of the optical device.

We now describe embodiments of an optical device that includes an optical component. While the optical device may include one or more of a wide variety of optical components (such as an optical modulator, an optical multiplexer, a photonic crystal, a quantum-well optical device, an optical de-multiplexer, an optical detector, an optical source, an optical switch, and/or an optical filter), in the discussion that follows a ring-resonator optical device (such as an optical filter or optical modulator) is used as an illustrative example.

In general, the ring-resonator optical device may include an optical waveguide. This optical waveguide may be implemented on silicon. Thermal tuning of the optical waveguide may be based on the increase in the index of refraction of silicon with temperature. By changing the temperature in the optical waveguide, the index of refraction, as well as the optical phase (which is proportional to the index of refraction) of the propagating laser light in the optical waveguide, can be tuned. In order to achieve efficient thermal tuning, the temperature change in the optical waveguide needs to be maximized for the available heater power. As noted previously, this may be achieved by selectively removing one or more portions of the substrate, while maintaining the mechanical strength of the optical device.

Figure 3:
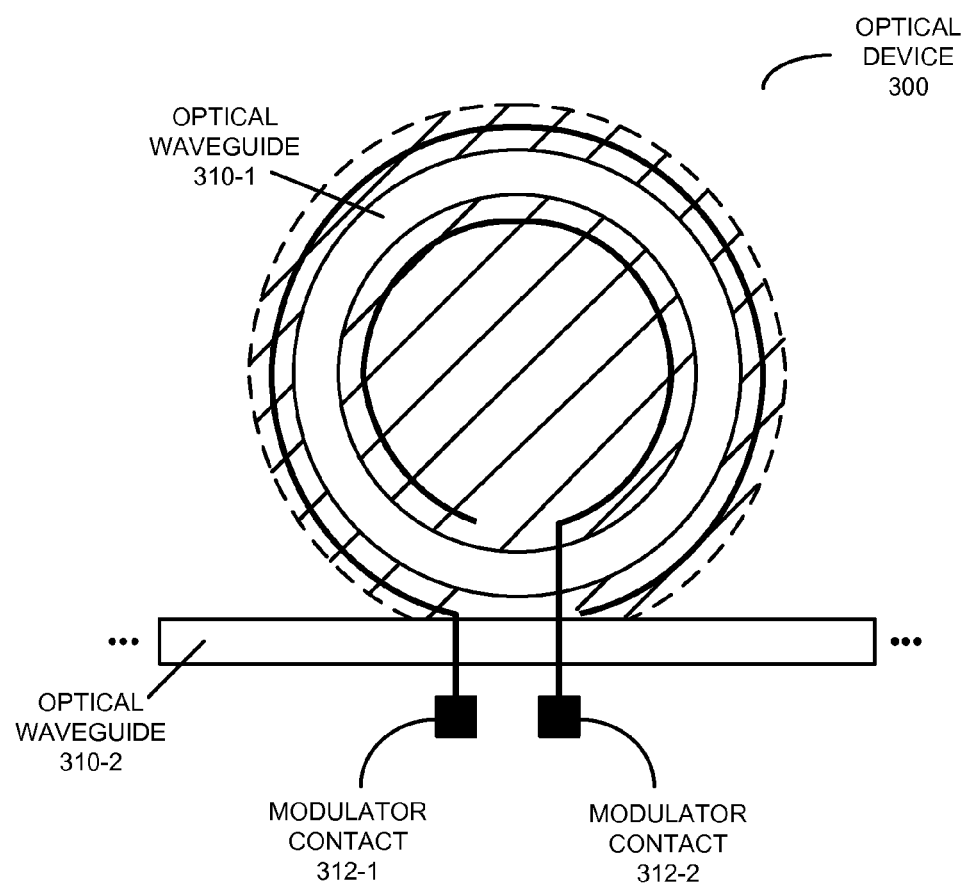
FIG. 3 is a block diagram illustrating a tunable optical device in accordance with an embodiment of the present disclosure.

This approach is shown in FIG. 1, which presents a block diagram illustrating a cross-sectional view of a tunable optical device 100. In this optical device, a substrate 110 (which may be a semiconductor, such as silicon) includes a wavelength-sensitive optical component 116 and a thermal-tuning mechanism 118 (such as a heater). For example, wavelength-sensitive optical component 116 may include a thermally tunable resonator optical waveguide, as illustrated by the p/n junction. (As shown in FIG. 3, the optical waveguide may be implemented in a ring-resonator configuration, so the two portions of the p/n junction shown in FIG. 1 are actually part of one continuous structure.) A resonant wavelength of this optical waveguide is a function of the temperature of the p/n junction. In particular, thermal-tuning mechanism 118 may modify the temperature of wavelength-sensitive optical component 116, thereby specifying an operating wavelength of wavelength-sensitive optical component 116.

Furthermore, a portion of substrate 110 is removed to create one or more gaps (such as gap 112) in the substrate defined by borders 114. This gap is proximate to thermal-tuning mechanism 118 and wavelength-sensitive optical component 116. Consequently, thermal-tuning mechanism 118 and at least a portion of wavelength-sensitive optical component 116 are undercut. Note that gap 112 reduces thermal coupling between an external environment and thermal-tuning mechanism 118 and at least the portion of wavelength-sensitive optical component 116 relative to the thermal coupling in an optical device without such a gap. If thermal-tuning mechanism 118 is implemented in the optical waveguide or proximate to the optical waveguide in this portion, the power consumption associated with thermal tuning of the optical waveguide is reduced because the thermal impedance of gap 112 is larger (10× or more) than the thermal impedance of substrate 110. For example, power consumption by thermal-tuning mechanism 118 may be less than 10-20 mW for a 180° phase shift in the optical waveguide (which is at least 2.5-5× lower than existing optical devices). Consequently, the fabrication technique can significantly reduce the power budget for silicon-based optical devices in WDM systems and computing systems that include optical interconnects.

Additionally, optical device 100 includes a binder material 120 that, at least in part, fills gap 112, thereby maintaining a mechanical strength of optical device 100. Binder material 120 may include a compound selected from: a polymer, silicon dioxide, polyimide, silicon nitride and/or alumina. More generally, binder material 120 may have a much lower thermal conductivity compared to substrate 110 (for example, a thermal conductivity that is 10× smaller than substrate 110). This may ensure that the thermal isolation of thermal mechanism 118 and at least the portion of wavelength-sensitive optical component 116 is increased (relative to an optical device without gap 112), and that the power consumption associated with thermal tuning of wavelength-sensitive optical component 116 is also reduced. Note that this binder material may partially, substantially or completely fill gap 112. For example, binder material 120 may fill 25%, 50%, 75%, 95% or 100% of gap 112.

In some embodiments, gap 112 has a width 122 and a depth 124, and width 122 may approximately equal to or smaller than depth 124 (i.e., the gap may have a high aspect ratio). For example, depth 124 may be 10 μm and width 122 may be less than or equal to 10 μm. Consequently, the aspect ratio (which equals depth 124 divided by width 122) may be a small number (such as 1) to a large number. The mechanical support provided by binder material 120 may be useful at a variety of aspect ratios, but in particular for small values of the aspect ratio.

In some embodiments, binder material 120 is permanently disposed on substrate 110. However, in other embodiments it may be temporarily disposed on substrate 110. For example, there may be an optional sacrificial layer 126 between binder material 120 and substrate 110 that facilitates subsequent removal of binder material after additional fabrication operations are performed on optical device 100.

In some embodiments, electrical connections to thermal-tuning mechanism 118 and/or the optical waveguide may be implemented using one or more optional air-bridge electrical couplings 128 between the portion of wavelength-sensitive optical component 116 and one or more power-supply contacts (which are shown in FIG. 3). This configuration may reduce the thermal coupling with the external environment in the plane of the optical waveguide, which is associated with the electrical connections to the optical waveguide. For example, thermal-tuning mechanism 118 (such as a passive resistor or an active device) may be situated proximate to the portion of wavelength-sensitive optical component 116, and therefore may have a low thermal impedance to the optical waveguide, and a high impedance to the external environment of optical device 100.

In some embodiments, resistive heating is implemented inside the optical waveguide (instead of using thermal-tuning mechanism 118, such as a heater, which is in close proximity to the optical waveguide). For example, one or more heating elements may be integrated in the optical waveguide and a controlled amount of current may be sourced from a tuning circuit (not shown) to these heating elements. However, doping the optical waveguide to implement the one or more heating elements may increase optical losses due to free-carrier absorption, which can degrade the quality factor of a ring-resonator optical device.

Note that optical device 100 may include multiple instances of the structure shown in FIG. 1. For example, there may be an array of optical waveguides implemented on substrate 110, each of which is at least partially thermally isolated from substrate 110 by gaps (such as gap 112). In these embodiments, these gaps may also reduce thermal coupling between the optical waveguides in the array, thereby reducing or eliminating thermal cross-talk.

Moreover, the temperatures of the optical waveguides in the array may be individually programmed, so that one or more optical waveguides can have different temperatures than other optical waveguides in the array. Therefore, in an array of optical waveguides (or more generally, an array of optical components), thermal-tuning mechanisms (such as thermal-tuning mechanism 118) may be used to produce arbitrary, programmable thermal profiles across the array or to create the necessary tuning, modulation and/or other functionality. Once the thermal-tuning mechanisms are turned on, the power to each may be chosen to increase the temperature of each ring-resonant optical device by the appropriate amount to achieve an operating temperature (and, thus, an operating wavelength) in the desired range. Moreover, the temperature control mechanism may include biased temperature control.

In some operating conditions, the absolute wavelength range of the array may experience drift. This can occur if the ambient temperature changes or if there is some global change in the temperature of substrate 110. However, even in this situation, active thermal management of the resonant wavelengths of the optical waveguides may still produce and maintain the correct wavelengths as long as the chip does not experience thermal runaway. This possibility can be substantially mitigated if active cooling is also used to control and maintain the global temperature of substrate 110 at a predetermined level.

Figure 2:
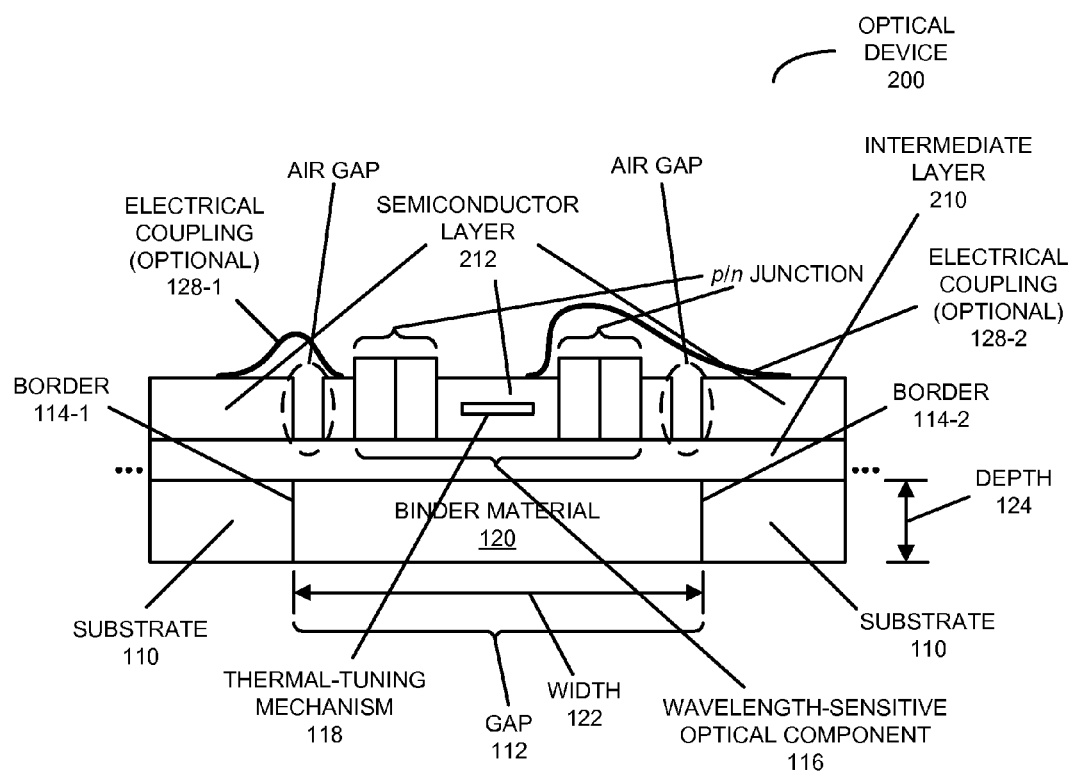
FIG. 2 is a block diagram illustrating a tunable optical device in accordance with an embodiment of the present disclosure.

As shown in FIG. 2, which presents a block diagram illustrating a tunable optical device 200, in some embodiments the wavelength-sensitive optical component is implemented in a semiconductor layer 212 that is disposed on an intermediate layer 210. Furthermore, intermediate layer 210 may be disposed on substrate 110. For example, substrate 110 may include silicon, intermediate layer 210 may include an oxide (such as silicon dioxide), and semiconductor layer 212 may include silicon. Thus, substrate 110, intermediate layer 210 and semiconductor layer 212 may comprise a silicon-on-insulator (SOI) technology. In this embodiment, semiconductor layer 212 may also include thermal-tuning mechanism 118. Moreover, the portion of substrate 110 is removed to create one or more gaps (such as gap 112) in substrate 110, and binder material 120, at least in part, fills gap 112. (Alternatively, as described below with reference to FIG. 4, binder material 120 may be deposited on a top surface of the optical device.)

In an exemplary embodiment, a silicon semiconductor layer 212 may be 0.5 μm thick and a silicon-dioxide intermediate layer 210 may have a thickness between 0.001 and 10 μm. In addition, the sidewalls of gap 112 may be thermally oxidized to avoid or to reduce scattering losses.

FIG. 3 presents a block diagram illustrating a top view of a tunable optical device 300, which includes optical waveguides 310. Optical waveguide 310-1 is situated above the gap (shown by the hatched region) and is supported by the binder material.

Operating bias for optical waveguide 310-1 may be provided by highly doped, low-resistance electrical modulator contacts 312 via air-bridge electrical couplings, such as optional electrical couplings 128 (FIGS. 1 and 2). Note that these modulator contacts can also be used to conduct heat and/or current from a chip that includes one or more waveguides to associated laser elements.

Figure 4:
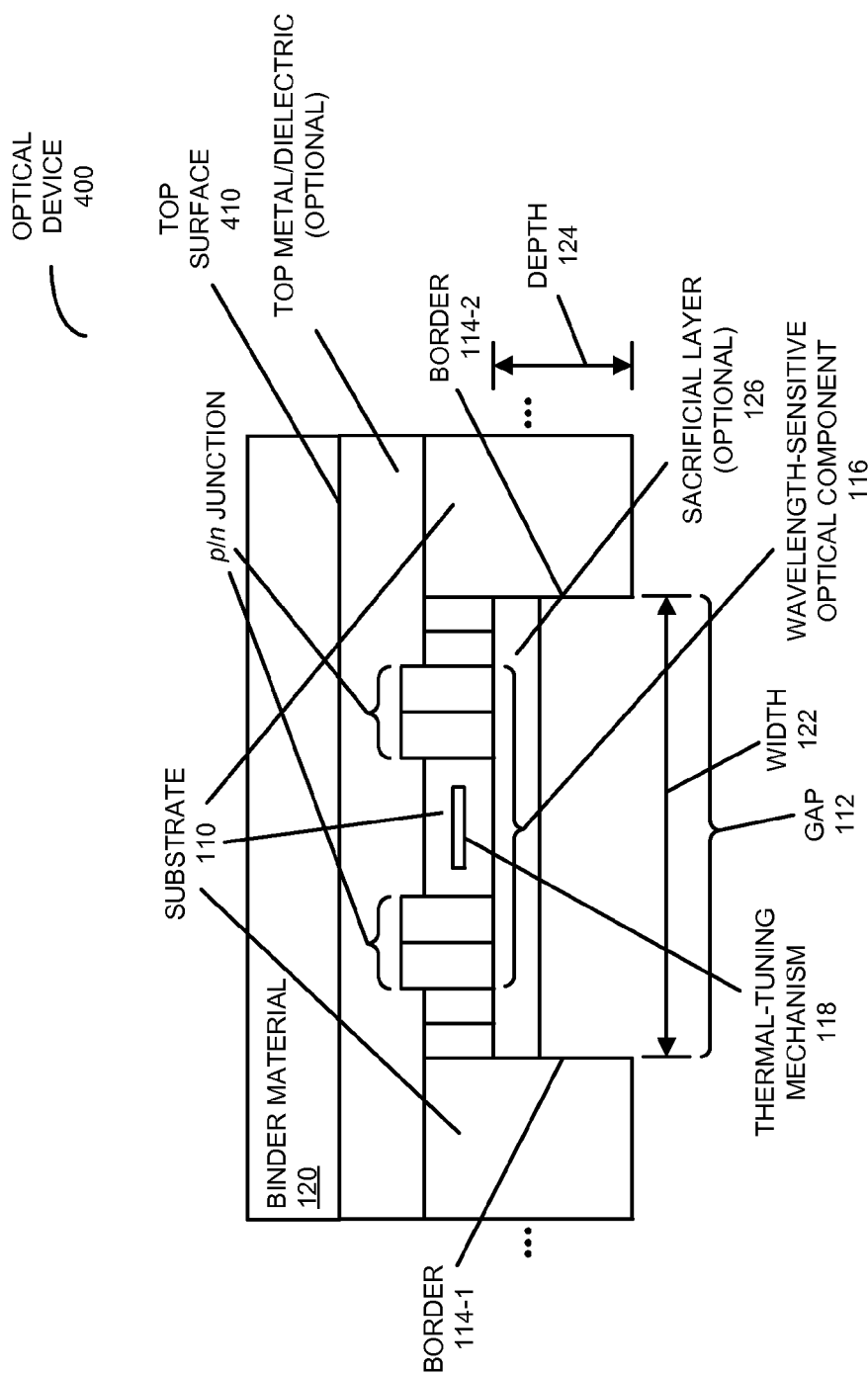
FIG. 4 is a block diagram illustrating a tunable optical device in accordance with an embodiment of the present disclosure.

While the preceding embodiments illustrated binder material 120 (FIGS. 1 and 2) under thermal-tuning mechanism 118 (FIGS. 1 and 2) and at least the portion of wavelength-sensitive optical component 116 (FIGS. 1 and 2), in other embodiments the binder material is over the thermal-tuning mechanism and at least the portion of wavelength-sensitive optical component. This is shown in FIG. 4, which presents a block diagram illustrating a tunable optical device 400. In this embodiment, binder material 120 may be deposited or disposed on a top surface 410, for example, on top of an optional top metal or dielectric layer, which, in turn, is deposited on top of substrate 110. Thus, substrate 110 may be etched and mechanical support may be provided from the top side of optical device 400. In general, the mechanical support may be provided from the bottom side, the top side or both, and this mechanical support may be temporary (i.e., removable) or permanent.

Figure 5:
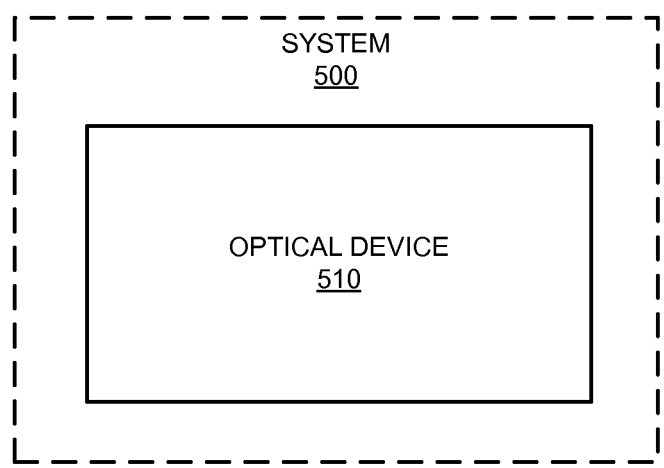
FIG. 5 is a block diagram illustrating a system that includes a tunable optical device in accordance with an embodiment of the present disclosure.

One or more of the preceding embodiments of the optical device may be included in a system and/or an electronic device. This is illustrated in FIG. 5, which presents a block diagram illustrating a system 500 that includes tunable optical device 510.

The optical device may be used in a variety of applications, including: VLSI circuits, communication systems (such as WDM), storage area networks, data centers, networks (such as local area networks), and/or computer systems (such as multiple-processor-core computer systems). Note that system 500 may include, but is not limited to: a server, a laptop computer, a communication device or system, a personal computer, a work station, a mainframe computer, a back plane, a blade, an enterprise computer, a data center, a portable-computing device, a supercomputer, a network-attached-storage (NAS) system, a storage-area-network (SAN) system, a switch, a hub, a bridge, a router, and/or another electronic computing device. Moreover, note that a given computer system may be at one location or may be distributed over multiple, geographically dispersed locations.

In some embodiments, one or more of the optical devices may be included in a multi-chip module (MCM) (such as a switch or a multiple-core processor) and/or in a system that includes the MCM. This MCM may include an array of chip modules (CMs) or single-chip modules (SCMs), and a given SCM may include at least one semiconductor die. Note that the MCM is sometimes referred to as a 'macro-chip.' Furthermore, the semiconductor die may communicate with other semiconductor dies, CMs, SCMs, and/or devices in the MCM using proximity communication of electromagnetically coupled signals (which is referred to as 'electromagnetic proximity communication'), such as capacitively coupled signals and/or proximity communication of optical signals (which are, respectively, referred to as 'electrical proximity communication' and 'optical proximity communication'). In some embodiments, the electromagnetic proximity communication includes inductively coupled signals and/or conductively coupled signals.

Optical device 100 (FIG. 1), optical device 200 (FIG. 2), optical device 300 (FIG. 3), optical device 400 (FIG. 4), and/or system 500 may include fewer components or additional components. For example, semiconductor layer 212 in FIG. 2 may include poly-silicon or amorphous silicon. In some embodiments, one or more gaps (such as gap 112 in FIG. 2) may extend into intermediate layer 210 (FIG. 2), for example, when a sacrificial portion of intermediate layer 210 (FIG. 2) is removed. Alternatively, intermediate layer 210 (FIG. 2) may be used as an etch stop. Furthermore, a wide variety of fabrication techniques (such as micromachining, dry etching, wet etching, etc.) may be used to fabricate the optical device in the preceding embodiments, as is known to one of skill in the art.

Note that embodiments of the optical device can also be used when the optical component is electrically tuned. In these embodiments, it may still be important that at least the portion of the optical component is thermally isolated from the external environment, and that this portion may have mechanical support (such as that provided by the binder material).

Although these embodiments are illustrated as having a number of discrete items, the embodiments of the optical device and the system are intended to be functional descriptions of the various features that may be present rather than structural schematics of the embodiments described herein. Consequently, in these embodiments two or more components may be combined into a single component, and/or a position of one or more components may be changed.

Figure 6:
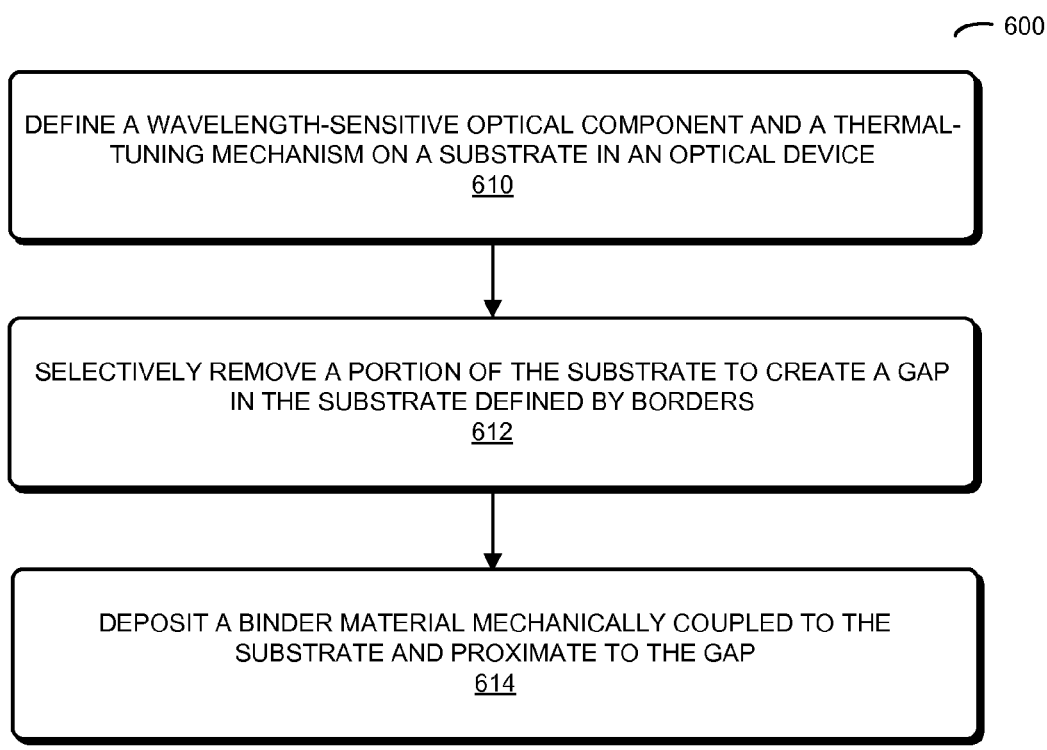
FIG. 6 is a flow chart illustrating a method for fabricating an optical device in accordance with an embodiment of the present disclosure.

We now describe a method for fabricating an optical device. FIG. 6 presents a flow chart illustrating a method 600 for fabricating an optical device, such as one of the optical devices in the preceding embodiments. In this method, the wavelength-sensitive optical component and the thermal-tuning mechanism are defined on the substrate in the optical device (operation 610). Note that the thermal-tuning mechanism modifies the temperature of the optical component, thereby specifying the operating wavelength of the wavelength-sensitive optical component. Then, the portion of the substrate is selectively removed to create the gap in the substrate defined by borders (operation 612), where the gap in the substrate is under the thermal-tuning mechanism and the wavelength-sensitive optical component. Furthermore, the binder material mechanically coupled to the substrate and proximate to the gap is deposited (operation 614), thereby maintaining the mechanical strength of the optical device.

In some embodiments of method 600, there may be additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical device, comprising:
   a substrate that includes a wavelength-sensitive optical component and a thermal-tuning mechanism, wherein the thermal-tuning mechanism is configured to modify the temperature of the wavelength-sensitive optical component, thereby specifying an operating wavelength of the wavelength-sensitive optical component, wherein a portion of the substrate is removed to create a gap in the substrate defined by borders, and wherein the gap is under the thermal-tuning mechanism and at least a portion of the wavelength-sensitive optical component; and
   a binder material mechanically coupled to the substrate at one or more sidewalls of the substrate created by the gap and proximate to the gap, thereby maintaining a mechanical strength of the optical device.

2. The optical device of claim 1, wherein the substrate includes a semiconductor.

3. The optical device of claim 2, wherein the semiconductor includes silicon.

4. The optical device of claim 1, wherein the binder material includes a compound selected from: a polymer, silicon dioxide, polyimide, silicon nitride and alumina.

5. The optical device of claim 1, wherein the binder material, at least in part, fills the gap.

6. The optical device of claim 1, wherein the binder material is mechanically coupled to a top surface of the substrate above the gap.

7. The optical device of claim 1, wherein the binder material substantially fills the gap.

8. The optical device of claim 1, wherein the wavelength-sensitive optical component includes an optical component selected from: an optical modulator, an optical multiplexer, an optical de-multiplexer, an optical detector, an optical source, an optical switch, and an optical filter.

9. The optical device of claim 1, wherein the gap has a width and a depth; and
   wherein the width is an order of magnitude larger than the depth.

10. An optical device, comprising:
    a substrate;
    an intermediate layer disposed on the substrate; and
    a semiconductor layer disposed on the intermediate layer, wherein the semiconductor layer includes a wavelength-sensitive optical component and a thermal-tuning mechanism, wherein the thermal-tuning mechanism is configured to modify the temperature of the wavelength-sensitive optical component, thereby specifying an operating wavelength of the wavelength-sensitive optical component, wherein a portion of the substrate is removed to create a gap in the substrate defined by borders, and wherein the gap is under the thermal-tuning mechanism and at least a portion of the wavelength-sensitive optical component; and
    a binder material mechanically coupled to the substrate at one or more sidewalls of the substrate created by the gap and proximate to the gap, thereby maintaining a mechanical strength of the optical device.

11. The optical device of claim 10, wherein the substrate includes a semiconductor.

12. The optical device of claim 10, wherein the substrate includes silicon, the intermediate layer includes silicon dioxide, and the semiconductor layer includes silicon.

13. The optical device of claim 10, wherein the substrate, the intermediate layer and the semiconductor layer comprise a silicon-on-insulator technology.

14. The optical device of claim 10, wherein the binder material includes a compound selected from: a polymer, silicon dioxide, polyimide, silicon nitride and alumina.

15. The optical device of claim 10, wherein binder material, at least in part, fills the gap.

16. The optical device of claim 10, wherein the binder material is mechanically coupled to a top surface of the substrate above the gap.

17. The optical device of claim 10, wherein the binder material substantially fills the gap.

18. The optical device of claim 10, wherein the wavelength-sensitive optical component includes an optical component selected from: an optical modulator, an optical multiplexer, an optical de-multiplexer, an optical detector, an optical source, an optical switch, and an optical filter.

19. The optical device of claim 10, wherein the gap has a width and a depth; and
    wherein the width is an order of magnitude larger than the depth.

20. A method for fabricating an optical device, comprising:
    defining a wavelength-sensitive optical component and a thermal-tuning mechanism on a substrate in the optical device, wherein the thermal-tuning mechanism is configured to modify the temperature of the wavelength-sensitive optical component, thereby specifying an operating wavelength of the wavelength-sensitive optical component;
    selectively removing a portion of the substrate to create a gap in the substrate defined by borders, wherein the gap is proximate to the thermal-tuning mechanism and the wavelength-sensitive optical component; and
    depositing a binder material which is mechanically coupled to the substrate at one or more sidewalls of the substrate created by the gap and proximate to the gap, thereby maintaining a mechanical strength of the optical device.

* * * * *